Figure 1:
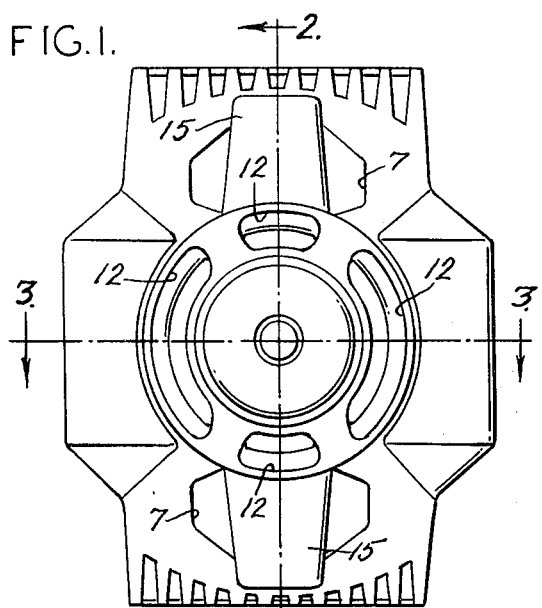

United States Patent [19]

Hallerback

[11] 4,142,120

[45] Feb. 27, 1979

[54] COMMUTATOR MOTOR

[75] Inventor: Stig L. Hallerback, Vastra Frolunda, Sweden

[73] Assignees: AB Electrolux, Stockholm, Sweden; SKF Industrial Trading and Development Company, Nieuwegein, Netherlands

[21] Appl. No.: 747,967

[22] Filed: Dec. 6, 1976

[30] Foreign Application Priority Data

Dec. 17, 1975 [SE] Sweden .............................. 7514241

[51] Int. Cl.$^2$ ............................................. H02K 9/00
[52] U.S. Cl. ...................................... 310/59; 310/227
[58] Field of Search ................... 310/233, 227, 58, 59, 310/224, 65, 43, 60, 62, 89, 63, 60

[56] References Cited

U.S. PATENT DOCUMENTS

| | | | |
|---|---|---|---|
| 1,892,997 | 1/1933 | Oldenburg | 310/60 R |
| 2,315,177 | 3/1943 | Zadnik | 310/227 |
| 2,729,758 | 1/1956 | Knapp | 310/60 R |
| 3,302,047 | 1/1967 | Short | 310/60 R |
| 3,486,055 | 12/1969 | Lipstein | 310/227 |
| 3,921,017 | 11/1975 | Hallerback | 310/216 |
| 3,932,929 | 1/1976 | Hallerback | 310/43 |
| 3,982,146 | 9/1976 | Hokky | 310/58 |

FOREIGN PATENT DOCUMENTS 1047298 12/1958 Fed. Rep. of Germany ........... 310/227

Primary Examiner—R. Skudy
Attorney, Agent, or Firm—Eugene E. Renz, Jr.

[57] ABSTRACT

A commutator motor constructed and arranged to provide cooling and removal of carbon dust produced during operation. The motor comprises a housing, a stator consisting of a plurality of laminations embedded in the housing and defining at least a pair of circumferentially spaced yoke portions and pole portions intermediate the yoke portions. The rotor is rotatably supported in the stator cavity. The yoke portions are of a predetermined configuration defining first axial channels having inlet and outlet openings to facilitate flow of cooling medium through the channels in one direction. A commutator chamber is provided at one axial end of the rotor and separated from the rotor cavity by a circumferentially extending wall. A series of second axial channels are provided outboard of the pole portions communicating with the commutator chamber at one axial end and a fan is provided at the other end of the motor to circulate a cooling medium through the second channels and commutator chamber in an axial direction opposite the direction of flow of the cooling medium through the first channels.

6 Claims, 4 Drawing Figures

U.S. Patent

Feb. 27, 1979

4,142,120

COMMUTATOR MOTOR

The present invention refers to commutator motors and its main purpose is to provide a solution of the problems of cooling and removal of carbon dust, which is produced at such motors during operation.

Commutator motors for alternating current are manufactured in series of millions and these motors are used in dust cleaners, sewing machines, mixers, electric hand tools and various other apparatus where a high effect is required from a small motor volume.

The motors are generally subjected to hard use and they require blower cooling in order to achieve that the winding temperature at the stator and at the armature shall be maintained within prescribed values and for the cooling of the commutator and the carbon brushes, which cooling is often required for giving the carbon brushes a sufficiently long life of service.

Due hereto a radial or axial blower is often mounted at the driving side of the shaft, i.e., at the side opposite to the commutator.

In several applications of use, as for instance in sewing machine motors, the armature diameter is about 30–35 mm and the rotational speed at operation is 5000–7000 rpm, which will give a peripheral velocity of 8–13 m/s. At such low peripheral velocities plain axial blowers are rather inefficient and radial blowers are in view hereof used. This is particularly pronounced at motors having encased stator windings where the demand for a good cooling with a high air velocity is particularly large.

As a result of the location of the radial blower opposite to the commutator side, air is sucked in over the cummutator and the cool brushes through the space between the stator and the armature and it is blown out in radial direction by the blower wheel. The carbon dust which has been generated at the contact between carbon brushes and commutator will thereby be accumulated on the armature and in the stator and this might after some time lead to flash-over between the winding and the armature-stator-iron or between the two carbon brush holders respectively. This problem is increased at decreasing air velocity and it is accentuated at motors having end shields of plastic material, which can be charged with static electricity and attract the carbon dust. This problem becomes most serious at double-insulated motors where all alive portions which can be touched are protected by a plastic casing which obstructs a free air flow.

It is thus highly desirable that the cooling air over the commutator has such a direction that the carbon dust from the carbon brushes is blown out from the motor in a manner which prevents accumulation of carbon dust and risk for electric flash-over.

It is possible in different types of motors to arrange axial channels between the armature and the stator. In particular in motors having salient poles can such channels easily be arranged between the yoke portions and the armature but it is also possible to provide channels in other types of motors, i.e., such having sheet metal laminations arranged in axial direction where channels easily will be formed between the armature and the yoke portions. It should in such motors be obvious to let the driving side- (or front side) - located blower force the cooling air through the channels over the commutator and thereby to blow out the carbon dust. This is, however, possible only if the outer diameter of the blower is limited to the same or a smaller size than the diameter of the armature. If the blower wheel is larger it will instead suck air through the cooling channel.

If the diameter of the blower wheel is limited in the above-mentioned way, the peripheral velocity will, however, be low, the inlet area will be small and the action of the blower will thereby be so poor that the temperature of the windings in the stator and the armature will exceed the acceptable value. For example in a band laminated stator motor having embedded windings, circulation of the cooling air at a high velocity is necessary for proper functioning of the motor.

The above-mentioned problems to obtain an efficient cooling and removal of the carbon dust from the carbon brushes has according to the present invention been solved by a commutator motor, which includes stator and armature and which is characterized by first axial cooling channels arranged between the yoke portions of the stator and the armature and second axial cooling channels arranged on the outside of the stator which second cooling channels open in a partly closed commutator room, which is provided with outlet openings.

According to a preferred embodiment of the invention a blower is arranged at the front side of the motor for forcing a cooling medium from the environment in a direction away from the commutator room through the channels between the yoke and the armature and in the opposite direction in the channels at the outside of the stator.

A commutator motor according to the invention is provided with an intermediate wall which extends inwardly towards the armature between the commutator part and the main portion of the armature and thereby defines the commutator chamber or room.

It is preferred that said intermedaite wall is arranged closer to the commutator side than to the main portion of the armature in order to obtain a pumping action into the commutator room.

Inlet openings for allowing the cooling medium to enter into the channels located between the yoke portions and the armature are preferably arranged between the holders for the carbon brushes and the yoke portions outside the partly closed commutator room.

Outlet openings for the cooling medium from the channels located between the yoke portions and the armature are preferably arranged at the front side of the motor adjacent to the yoke portions.

Inlet openings for allowing the cooling medium to enter into the channels located at the outside of the stator are preferably arranged at the front side of the motor.

The type of motors which is particularly well suited for the invention is such where the sheet metal laminations of the stator are longitudinal and has its edges bent inwardly against the cavity of the armature and which furthermore has its windings arranged around the yoke portions.

As it is difficult to make the intermediate wall and the channels at conventional motors it is most suitable to use the invention in connection with motors, which are manufactured in axially separated parts and are made from plastic material by means of injection molding. The cooling channels and the intermediate wall then can be made at an unsignificant additional cost as compared to a motor without channels and intermediate wall.

Figure 3:
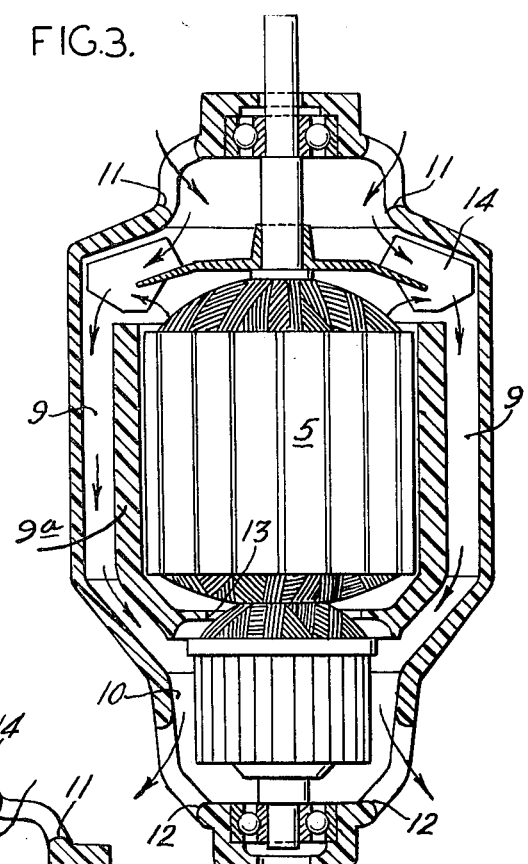
Figure 2:
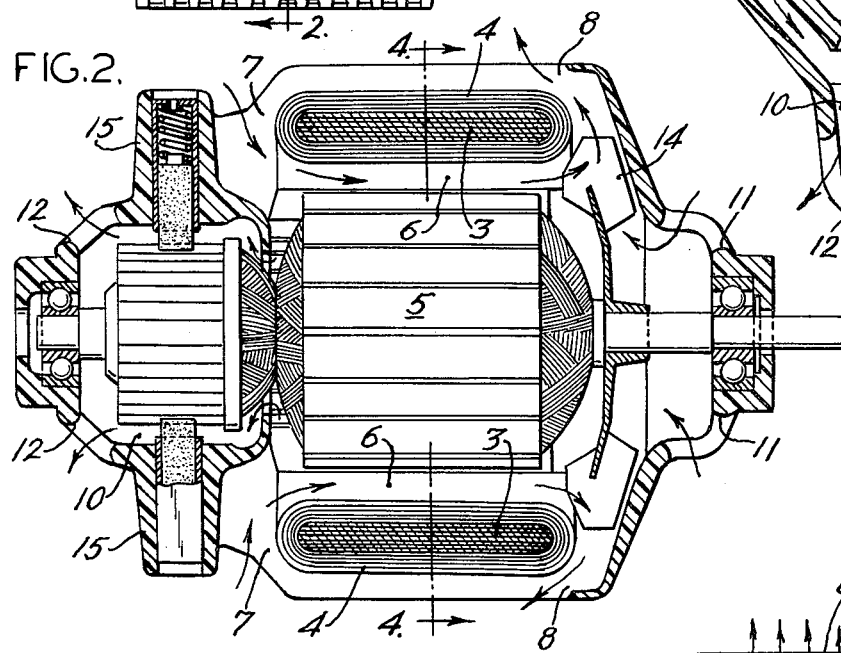
Figure 4:
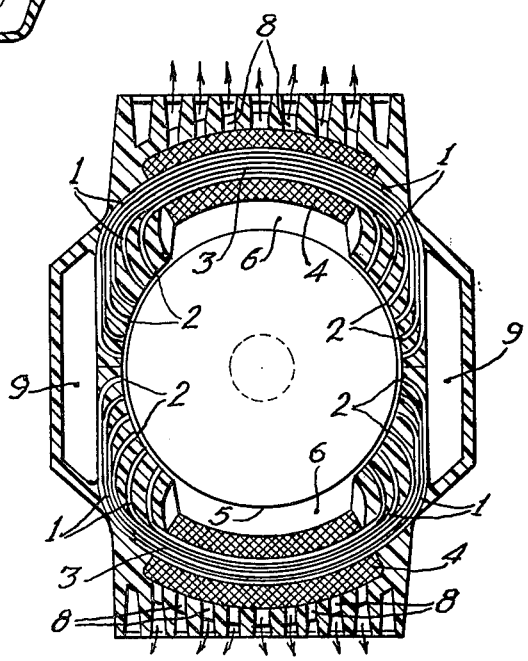

The invention will herebelow be further described with reference to the accompanying drawings, in which:

FIG. 1 is an end view of a motor made in accordance with the present invention as viewed from the commutator side;

FIGS. 2 and 3 are longitudinal sectional views taken on lines 2—2 and 3—3 respectively of FIG. 1; and FIG. 4 is a sectional view taken on line 4—4 of FIG. 2.

The motor according to the figures is of the type having longitudinal sheet metal laminations 1, which have their edges 2 bent inwardly towards the armature space. The yoke portion 3 is provided with windings 4. The stator, which is made from two axially interconnectable parts, is embedded in a plastic material.

The yoke portions 3 are of a predetermined configuration to define first axial channels 6. Channels 6 are formed between the yoke part 3 of the stator and the armature 5. These channels are provided with inlet openings 7 and outlet openings 8.

At the outside of the stator at a location outside the poles are arranged channels 9. These channels 9 open into the commutator room or chamber 10 and have their inlet openings 11 at the front side of the motor. The commutator chamber as illustrated is located at one axial end of the rotor and separated therefrom by a circumferentially extending wall 13 which extends radially inwardly close to the rotor and spaced therefrom to define a small annular gap. The channels 9 as illustrated are located outboard of the stator and pole portions and include a wall portion 9a separating the channels 9 and the stator cavity. The commutator room 10 is provided with outlet openings 12 for the cooling medium and it is delimited inwardly towards the main portion of the armature by the intermediate wall 13.

The blower 14 is arranged at the front side of the motor and said blower has an outer diameter, which, as can be seen from the figures, is essentially larger than the outer diameter of the rotor. Cooling medium will due hereto be sucked in through the openings 7 and it will flow between the stator and the armature in a direction away from the carbon brush holder 15 and out through the outlet openings 8. Some of the cooling medium, which enters through openings 11 will also flow out through these openings 8.

The main portion of the air which enters through the openings 11, however, will flow through the channels 9 into the commutator room 10 and out through the openings 12. The carbon dust which has been generated is thereby blown directly out from the motor at the same time as an efficient cooling is achieved. By this arrangement as illustrated by the arrows in the drawings, cooling medium flows through the channels 6 in one axial direction and the fan means circulates cooling medium through the channels 9 and the commutator chamber in an axial direction opposite the direction of flow of the cooling medium through the first channel 6.

The intermediate wall 13 prevents the air flow in the commutator room from returning through the channels 6. In order to guarantee that such a return flow of air is not possible it is preferable to arrange the intermediate wall as near to the commutator as possible in order to obtain a pumping action directed into this. This pumping action is further increased by ejector action which comes from the cooling air flowing through the channels 9.

The invention is not limited to the embodiment shown but can be modified in several ways within the scope of the appended claims.

I claim:

1. A commutator motor comprising a housing, a stator consisting of a plurality of laminations embedded in the housing and defining at least a pair of circumferentially spaced yoke portions and pole portions intermediate the yoke portions, a rotor rotatably supported in the stator cavity, the yoke portions being of a predetermined configuration defining first axial channels having inlet and outlet openings to facilitate flow of cooling medium through the channels in one direction, a commutator chamber at one axial end of the rotor separated by a circumferentially extending wall, said circumferentially extending wall extending radially inwardly close to the rotor and spaced therefrom to define a small annular gap, the arrangement providing a pumping action of cooling medium through the commutator chamber, means defining second channels outboard of the stator and pole portions including a wall portion separating said second channels and said stator cavity communicating with said chamber at one end and fan means to circulate a cooling medium through said second channels and chamber in an axial direction opposite the direction of flow of said cooling medium through said first channels.

2. A commutator motor as claimed in claim 1, wherein the inlet openings for said first axial channels are disposed between brush holders in the commutator chamber and the yoke portions outside the commutator chamber.

3. A commutator motor as claimed in claim 1 wherein the outlet openings for the first axial channels are arranged at the front side of the motor adjacent the yoke portions.

4. A commutator motor as claimed in claim 1 wherein the inlet openings for the cooling medium to the second axial channels are located at the front side of the motor.

5. A commutator motor as claimed in claim 1 wherein the stator laminations are arranged in a longitudinal direction and have edge portions bent radially inwardly toward the stator cavity and including windings circumscribing the yoke portions.

6. A commutator motor as claimed in claim 1 wherein said fan means has an outer diameter greater than the diameter of said rotor.

* * * * *